US006525949B1

(12) United States Patent
Johnson et al.

(10) Patent No.: US 6,525,949 B1
(45) Date of Patent: Feb. 25, 2003

(54) CHARGE PUMP CIRCUIT

(75) Inventors: Mark G. Johnson, Los Altos, CA (US); Joseph G. Nolan, III, San Jose, CA (US); Matthew P. Crowley, San Jose, CA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 09/748,815

(22) Filed: Dec. 22, 2000

(51) Int. Cl.$^7$ ................................................ H02M 3/18
(52) U.S. Cl. ...................................................... 363/60
(58) Field of Search ...................... 363/59, 60; 327/536, 327/537

(56) References Cited

U.S. PATENT DOCUMENTS

| | | | | |
|---|---|---|---|---|
| 5,036,229 A | * | 7/1991 | Tran ............................. | 307/497 |
| 5,432,469 A | | 7/1995 | Tedrow et al. ................. | 327/306 |
| 5,508,971 A | | 4/1996 | Cernea et al. ............. | 365/185.23 |
| 5,596,532 A | | 1/1997 | Cernea et al. ............. | 365/185.18 |
| 5,699,387 A | * | 12/1997 | Seto et al. .................... | 375/376 |
| 5,767,735 A | | 6/1998 | Javanifard et al. ........... | 327/536 |
| 5,898,328 A | * | 4/1999 | Shoji ............................ | 327/157 |
| 5,942,949 A | * | 8/1999 | Wilson et al. ................. | 331/17 |
| 5,978,283 A | | 11/1999 | Hsu et al. ................. | 365/189.09 |
| 6,272,670 B1 | | 8/2001 | Van Myers et al. ........... | 716/17 |

OTHER PUBLICATIONS

Dickson, J. F., "On–Chip High–Voltage Generation in MNOS Integrated Circuits Using an Improved Voltage Multiplier Technique," IEEE Journal of Solid–State Circuits, vol. SC–11, No. 3, pp 374–378 (1976).

Kawahara, T., et al., "Internal Voltage Generator for Low Voltage, Quarter–Micrometer Flash Memories," IEEE Journal of Solid–State Circuits, vol. 33, No. 1, pp. 126–132 (1998).

Wang, Chi–Chang and Wu, Jiin–chuan, "Efficiency Improvement in Charge Pump Circuits," IEEE Journal of Solid–State Circuits, vol. 32, No. 6, pp. 852–860 (1997).

Kawahara, T. et al., "Bit–Line Clamped Sensing Multiplex and Accurate High Voltage Generator for Quarter–Micron Flash Memories," IEEE Journal of Solid–State Circuits, vol. 31, No. 11, pp. 1590–1600 (1996).

Tanzawa, Toru and Tanaka, Tomoharu, "A Dynamic Analysis of the Dickson Charge Pump Circuit," IEEE Journal of Solid–State Circuits, vol. 32, No. 8, pp. 1231–1240 (1997).

Gariboldi, Roberto and Pulvirenti, Francesco, "A 70 mω Intelligent High Side Switch with Full Diagnostics," IEEE Journal of Solid–State circuits, vol. 31, No. 7 pp. 915–923 (1996).

\* cited by examiner

*Primary Examiner*—Matthew Nguyen
(74) *Attorney, Agent, or Firm*—Zagorin, O'Brien & Graham, LLP (57) ABSTRACT

A charge pump circuit includes, in a preferred embodiment, a plurality of serially-connected pump stages, each of which is driven by one or more associated clock signals for the stage. The amplitude of the clock signals associated with a respective one of the pump stages differ in amplitude from that of the clock signals associated with at least one other pump stage. As a result, the additional voltage achieved by each successive pump stage may be progressively larger for each successive pump stage. An exemplary charge pump circuit provides clock signals which increase in amplitude with each successive pump stage, and provides with each successive pump stage an output voltage having a magnitude that is a multiplicative factor of the magnitude of the input voltage for the stage. Consequently, the output voltage achieved by the exemplary charge pump circuit is an exponential function of the number of pump stages within the charge pump circuit.

34 Claims, 9 Drawing Sheets

CHARGE PUMP CIRCUIT

BACKGROUND OF THE INVENTION

1. Field of the Invention

The present invention relates to semiconductor voltage generator circuits, and particularly to capacitive voltage multiplier circuits.

2. Description of the Related Art

Many integrated circuits, particularly those using a single power supply voltage, incorporate on-chip circuitry to generate a "boosted" voltage having a magnitude greater than the power supply voltage. Frequently this boosted voltage is used as a veritable power supply voltage for portions of the circuitry contained on the integrated circuit. For example, certain types of semiconductor memories, such as "flash" EEPROM memories, write a memory cell by accelerating electrons across a tunneling dielectric and storing the charge on a floating gate above a field effect transistor. On contemporary devices, this acceleration of charge across the tunneling dielectric frequently requires a "write voltage" on the order of 8 volts, yet the remainder of the operations of the memory circuitry typically requires a voltage on the order of only 3 volts, including reading the memory cells. Unlike many older devices which require two different power supply voltages be supplied to operate the device (e.g., +5 and +12 volts), many contemporary devices require only a single power supply voltage (usually called VDD) equal to 2.5–3.3 volts (relative to "ground" or VSS). This VDD power supply voltage is typically utilized to power most of the device, including the normal read operation circuits. The write voltage (frequently, although not always, called VPP for legacy reasons) is generated by an on-chip voltage generator having a typical value of +8 volts (again relative to VSS) rather than requiring a separate power supply voltage be supplied by a user of the device.

In many integrated circuits, such on-chip voltage generators are implemented as capacitive voltage multiplier circuits, largely because of the historical ease of monolithicly implementing suitably large capacitors, especially compared to monolithicly implementing good quality inductors. These capacitive voltage multiplier circuits are usually called "charge pumps" by those in the art. Not to be confused with capacitive voltage multiplier circuits, there is another class of circuits also frequently called charge pumps. These are frequently used to integrate small current pulses generated each cycle by a phase detector circuit, and to consequently generate an analog voltage on a capacitor node which represents the phase error between two phase detector input signals. During each cycle, a typical phase detector "pumps" a first current pulse into the capacitor node and "pumps" a second current pulse from the capacitor node. If the phase error is zero, these two current pulses are equal, and the voltage on the capacitor node is unchanged. But if the phase of one input signal lags the other, one of the current pulses is greater in magnitude, or longer in duration, or both, so that the net charge into the capacitor node is non-zero, and a voltage change results. Such "phase detector integrator" charge pumps are quite different in both function and structure, and are consequently not considered to be related to capacitive voltage multiplier circuits. Consequently, as used herein, a "charge pump" refers to a capacitive voltage multiplier circuit and not to such phase detector integrator circuits, unless the context so requires.

In the nonvolatile memory example described above, the write voltage generated by the charge pump is higher than the VDD power supply voltage provided to the device. In other integrated circuits, a charge pump is frequently used to generate a voltage below the reference voltage VSS (i.e., "below ground"). For example, a negative bias voltage is generated in many memory devices such as dynamic random access memories (DRAMs), static random access memories (SRAMs), and other circuits, to bias a substrate and/or a CMOS well within the substrate. Charge pumps for such purposes have been used for over twenty years.

Figure 1:
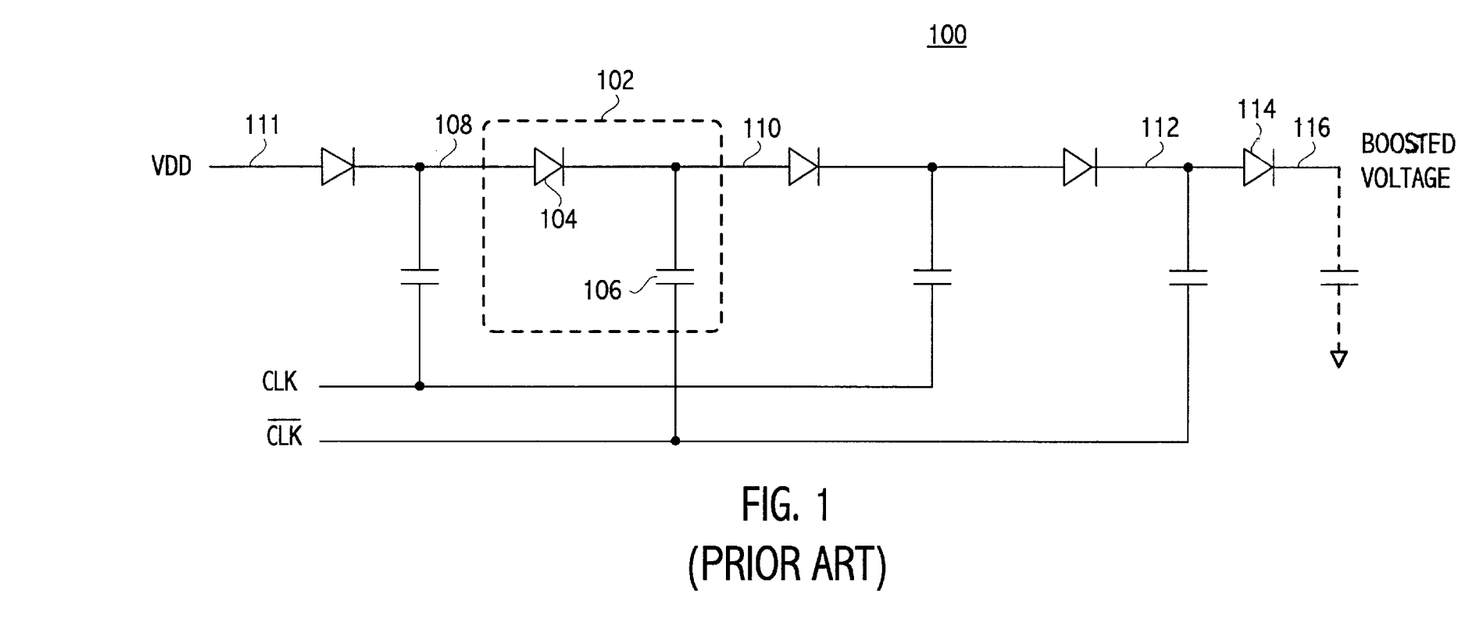
FIG. 1, labeled prior art, is a schematic diagram of a traditional charge pump circuit frequently used for generating a voltage above VDD.

Referring now to FIG. 1, a schematic diagram of a traditional (and very well known) charge pump circuit for generating a boosted voltage above VDD is shown, which circuit is taught by John F. Dickson in "On-Chip High-Voltage Generation in NMOS Integrated Circuits Using an Improved Voltage Multiplier Technique," IEEE Journal of Solid State Circuits, Vol. SC-11, No. 3, June 1976, pp. 374–378. The charge pump 100 includes a plurality of serially-connected charge pump stages, one of which is labeled 102. Each charge pump stage includes a diode, such as diode 104, and a pump capacitor, such as capacitor 106, and has an input node, such as node 108, and an output node, such as node 110. A complementary pair of clock signals CLK and /CLK (labeled in the figure as CLK "bar" with the traditional inverting "bar" over the name) are provided to drive the various pump stage capacitors. Odd-numbered (or alternately even-numbered) pump stages are driven by the CLK signal, while even-numbered (alternately odd-numbered) pump stages are driven by the /CLK signal. The input node of the first serially-connected charge pump stage, here labeled as node 111, is usually connected to the VDD power supply. A final isolation diode 114 may be considered as part of the last serially-connected charge pump stage, and the output voltage of the charge pump 100 taken from node 116 rather than from node 112 (which would otherwise be considered the output node of the last serially-connected charge pump stage).

The complementary clock signals may be overlapping or non-overlapping clock signals, and are usually driven with full VDD-level swings (i.e., transitioning between a low level of VSS and a high level of VDD). Consequently, each charge pump stage boosts the voltage conveyed to its input node by an amount equal to VDD less a diode drop (assuming relatively negligible DC current and ignoring second order effects). Including the effect of the last isolating diode 114, the maximum theoretical output voltage achievable from such a charge pump 100 is equal to VDD (N)–VDIODE(N+1), where N is the number of charge pump stages and VDIODE is the forward diode drop. In practice, the diodes are frequently implemented as diode-connected FETs (field effect transistors), and the capacitors implemented as large FETs, each with its source and drain terminals connected together to form one terminal of the capacitor, and its gate terminal forming the other terminal of the capacitor. Furthermore, the output voltage is usually somewhat less than this theoretical value, due to stray capacitances, incomplete charge transfer, DC current flow provided into the output node, and other effects, which have been well studied in the literature.

While on-chip voltage generator circuits may relieve a user from supplying a second power supply voltage, such circuits frequently require a significant amount of layout area to implement, which may increase die size substantially, and consequently increase costs. Moreover, such voltage generator circuits also may consume a significant amount of power relative to the remainder of the circuit, and thus increase the current that must be supplied by the user (e.g., by the VDD power supply). Any increase in power dissipation may also increase the temperature of the die during operation. In a battery-powered environment, any increase in power consumed by a device may have significant implications for battery life, and any additional heat generated may also be difficult to dissipate. Consequently, continued improvements in charge pump circuits are desired.

SUMMARY OF THE INVENTION

Traditional charge pump circuits utilize a plurality of serially-connected pump stages, which are driven by clock signals of identical amplitude. This results in a uniform additional voltage contributed by each pump stage, and an output voltage which is generally a multiplicative function of the number of pump stages. If instead the clock signals increase in amplitude for each successive pump stage, the additional voltage contributed by each successive pump stage increases for each such successive pump stage. An exemplary charge pump circuit in accordance with the present invention provides with each successive pump stage an output voltage that is a multiple, although not necessarily an integral multiple, of the input voltage for the stage. Consequently, the output voltage achieved by such an exemplary charge pump circuit is an exponential function of the number of pump stages within the charge pump circuit.

Many particular circuit arrangements of pump stages are contemplated by the present invention, including pump stages responsive to a single clock, as well as others that are responsive to a complementary pair of clock signals. Moreover, other embodiments of the invention include pump stages that lose a diode drop with each stage, as well as those pump stages that "fully charge" an associated capacitor and thus do not lose any diode drop per stage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
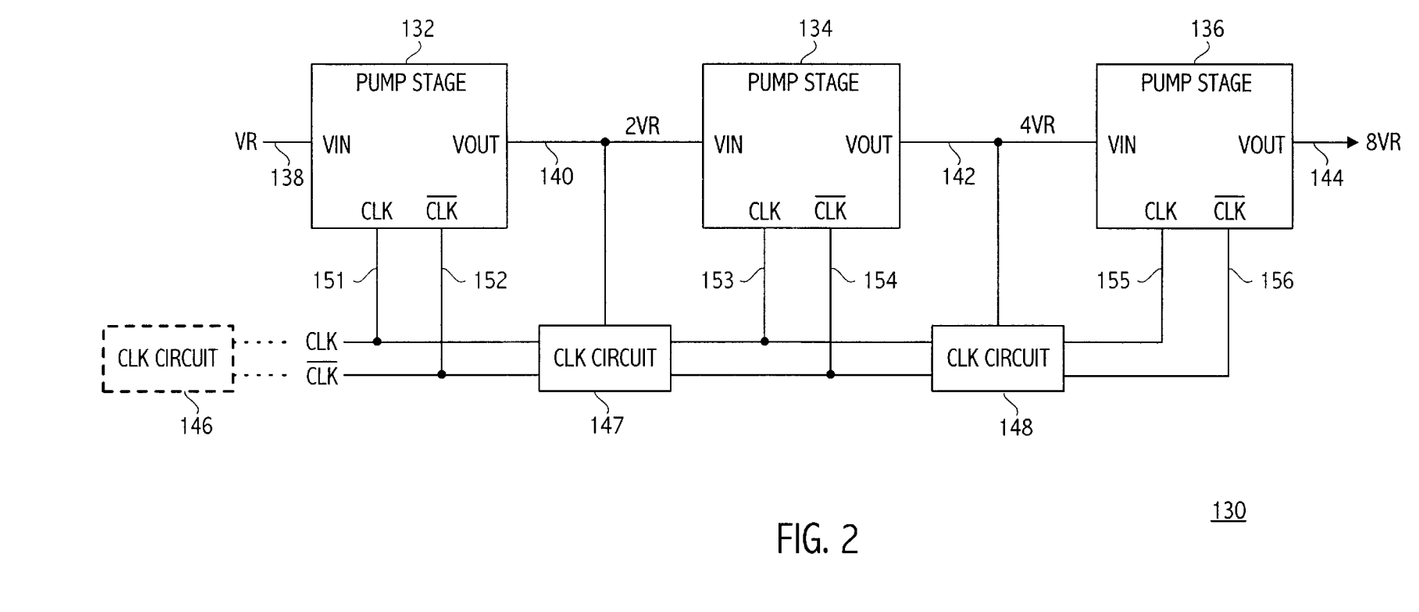
FIG. 2 is a block diagram of a charge pump circuit in accordance with a preferred embodiment of the present invention.

Referring now to FIG. 2, a block diagram is shown of an improved charge pump in accordance with a preferred embodiment of the present invention. The charge pump circuit 130 includes three serially-connected charge pump stages 132, 134, and 136. Each pump stage is contemplated to be identical or similar to the other two, although such is not required, and the three charge pump stages may be sized non-identically, as further described below. While the charge pump circuit 130 is shown utilizing three such charge pump stages, it should become clear that lesser or greater numbers of charge pump stages are also contemplated.

An input voltage, here denoted as having a magnitude VR, is conveyed on node 138 to a VIN input of the first charge pump stage 132. A complementary pair of clock signals CLK and /CLK are conveyed respectively on nodes 151 and 152 to corresponding complementary clock inputs of the charge pump stage 132. These CLK and /CLK signals may be generated by a clock circuit 146, which may be locally proximate to the charge pump circuit 130, or may generally form a portion of a clock distribution network and be located distant from the charge pump circuit 130. If the VR voltage is equal to VDD, the complementary pair of clock signals CLK and /CLK are preferably full VDD-level signals. If the VR voltage is less than VDD, the clock signals CLK and /CLK are preferably VR-level signals (e.g., having a high level of VR and a low level of VSS), although clock signals having an amplitude of other than VR are also suitable. The first charge pump stage 132 generates on a VOUT output node thereof a voltage having a magnitude nominally equal to twice its input voltage VR (i.e., 2VR). Assuming the VR voltage is equal to VDD, the output voltage VOUT of the first charge pump stage 132 (i.e., node 140) is then nominally equal to 2VDD. This output voltage is conveyed on node 140 to the VIN input of the next serially-connected charge pump stage 134. Preferred embodiments of such a charge pump stage 132 utilizing complementary clock signals are described herebelow.

A clock circuit 147 receives the complementary pair of clock signals CLK and /CLK and receives the 2VR voltage conveyed on node 140, and generates on its output nodes 153, 154 a second pair of complementary clock signals, each having an amplitude of 2VR, which are coupled to corresponding complementary clock inputs of the charge pump stage 134. Assuming a voltage having a magnitude 2VR is conveyed on node 140, the second charge pump stage 134 generates on a VOUT output node thereof a voltage having a magnitude nominally double that of its input voltage, or 4VR. This output voltage is conveyed on node 142 to the VIN input of the next serially-connected charge pump stage 136.

A second clock circuit 148 also receives the complementary pair of clock signals conveyed on nodes 153, 154 (each having a 2VR amplitude), and receives the 4VR voltage on node 142, and generates a third pair of complementary clock signals, each having an amplitude of 4VR, which are respectively conveyed on its output nodes 155, 156 to corresponding complementary clock inputs of the charge pump stage 136. The charge pump stage 136 generates on its VOUT output node (i.e., node 144) a voltage having a magnitude nominally equal to 8VR, which, as with the other charge pump stages, is double its input voltage. Assuming the VR voltage is equal to VDD, the output voltage VOUT of the third charge pump stage 136 (i.e., node 144) is then nominally equal to 8VDD. The output voltage of the charge pump circuit 130 is consequently an exponential function of the number of pump stages. In a traditional charge pump circuit, the voltage of node 142 would usually be 3VR and the voltage of node 144 would usually be 4VR and the output voltage of such a charge pump circuit is generally a multiplicative function of the number of pump stages.

Figure 3:
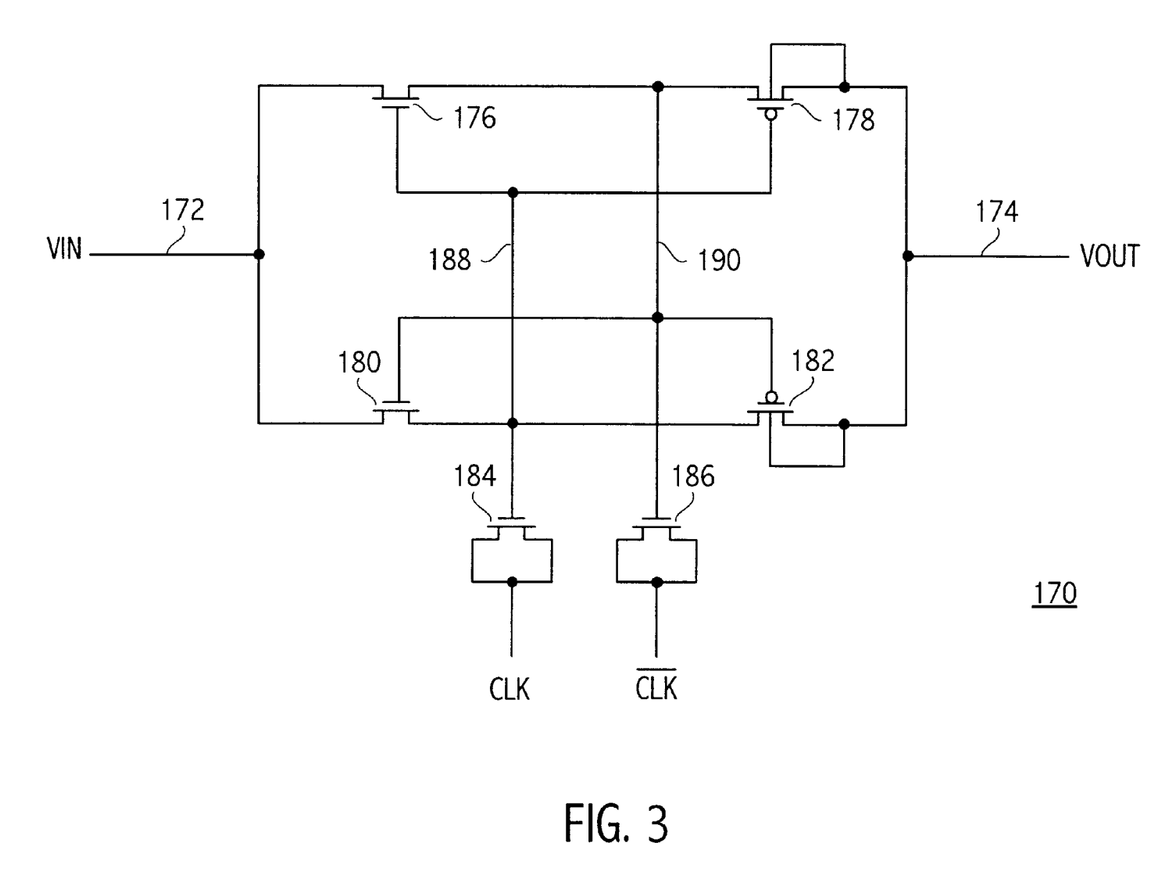
FIG. 3 is a schematic diagram of a preferred embodiment of a charge pump stage useful for the present invention.

A preferred embodiment of the charge pump stages 132, 134, and 136 is shown in FIG. 3. A charge pump stage 170 includes two N-channel field effect transistors (FETs) 176, 180 and two P-channel transistors 178, 182 configured as a cross-coupled latch, and further includes two capacitors 184, 186, each preferably implemented using an N-channel field effect transistor, as shown. To most easily appreciate the operation of this charge pump stage 170, assume that VIN is a positive voltage, and that the complementary clock signals CLK, /CLK are both VIN-level clock signals (i.e., having a low level equal to VSS and a high level equal to VIN). When the CLK signal is driven high, cross-coupled node 188 is boosted by capacitor 184 to a level above the VIN voltage that is high enough to turn transistor 176 on, thereby driving cross-coupled node 190 to the VIN voltage. Since at this time the complementary clock signal /CLK is low, the full input voltage VIN is developed across the capacitor 186.

When the two complementary clock signals transition, node 188 is capacitively coupled downward by the falling edge of the CLK signal to approximately the VIN voltage, which turns transistor 176 off, and node 190 is capacitively coupled upward by the rising edge of the /CLK signal to a voltage approximately equal to 2VIN. With node 190 at 2VIN, and node 188 at VIN, transistor 178 is turned on and drives the VOUT output voltage to 2VIN (assuming that the magnitude of the VIN voltage is greater than the magnitude of the P-channel threshold voltage). At the same time, transistor 180 is turned on (assuming node 190 is higher than VIN by more than the N-channel threshold voltage) which drives (or refreshes) node 188 to the VIN potential. Since at this time the clock signal CLK is low, the full VIN voltage is now developed across capacitor 184. Transistor 182 is turned off, as its source voltage (node 174) is at 2VIN, its gate voltage (node 190) is also at 2VIN, and its drain voltage (node 188) is at VIN, and no current flows therethrough which would otherwise interfere with charging capacitor 184.

If the VIN voltage is equal to VDD, the complementary clock signals CLK, /CLK are both preferably VDD-level clock signals. When the CLK signal is high (i.e., at VDD), cross-coupled node 188 is boosted by capacitor 184 to 2VDD, which is high enough to turn transistor 176 on, thereby driving cross-coupled node 190 to VDD. Since at this time the complementary clock signal /CLK is low, the full VDD voltage is developed across the capacitor 186.

When the two complementary clock signals transition, node 188 is capacitively coupled downward to approximately VDD by the falling edge of the CLK signal, which turns transistor 176 off, and node 190 is capacitively coupled upward by the rising edge of the /CLK signal to a voltage approximately equal to 2VDD. With node 190 at 2VDD, and node 188 at VDD, transistor 178 is turned on which drives the VOUT output voltage to 2VDD. At the same time, transistor 180 is turned on which drives (or refreshes) node 188 to VDD, and the full VDD voltage is now developed across capacitor 184. Transistor 182 is turned off, as its gate voltage (node 190) is equal to 2VDD which is equal to the higher of its source or drain voltage.

Generalizing the operation of this charge pump stage 170, when the CLK signal is high, the node 188 voltage is equal to 2VIN and the node 190 voltage is equal to VIN. Transistor 176 is on which charges capacitor 186 to the input VIN voltage, transistors 178 and 180 are off, and transistor 182 is on which couples the 2VIN voltage on node 188 to the VOUT output node 174. Conversely, when the CLK signal is low, the node 188 voltage is equal to VIN and the node 190 voltage is equal to 2VIN. Transistor 180 is on which charges capacitor 184 to the input VIN voltage, transistors 176 and 182 are off, and transistor 178 is on which couples the 2VIN voltage on node 190 to the VOUT output node 174.

Referring back to FIG. 2, it should be appreciated that implementing each of the charge pump stages 132, 134, 136 using a circuit such as that depicted for charge pump stage 170, results in an output voltage for each stage which is proportional to (i.e., a multiplicative factor of) the input voltage for the stage (e.g., a doubling of the voltage by each successive charge pump stage), rather than a constant additive increase in voltage with each successive stage. In other words, the charge pump circuit 130 affords an output voltage which is an exponential function of the number of charge pump stages, rather than a multiplicative function of the number of charge pump stages.

Figure 4:
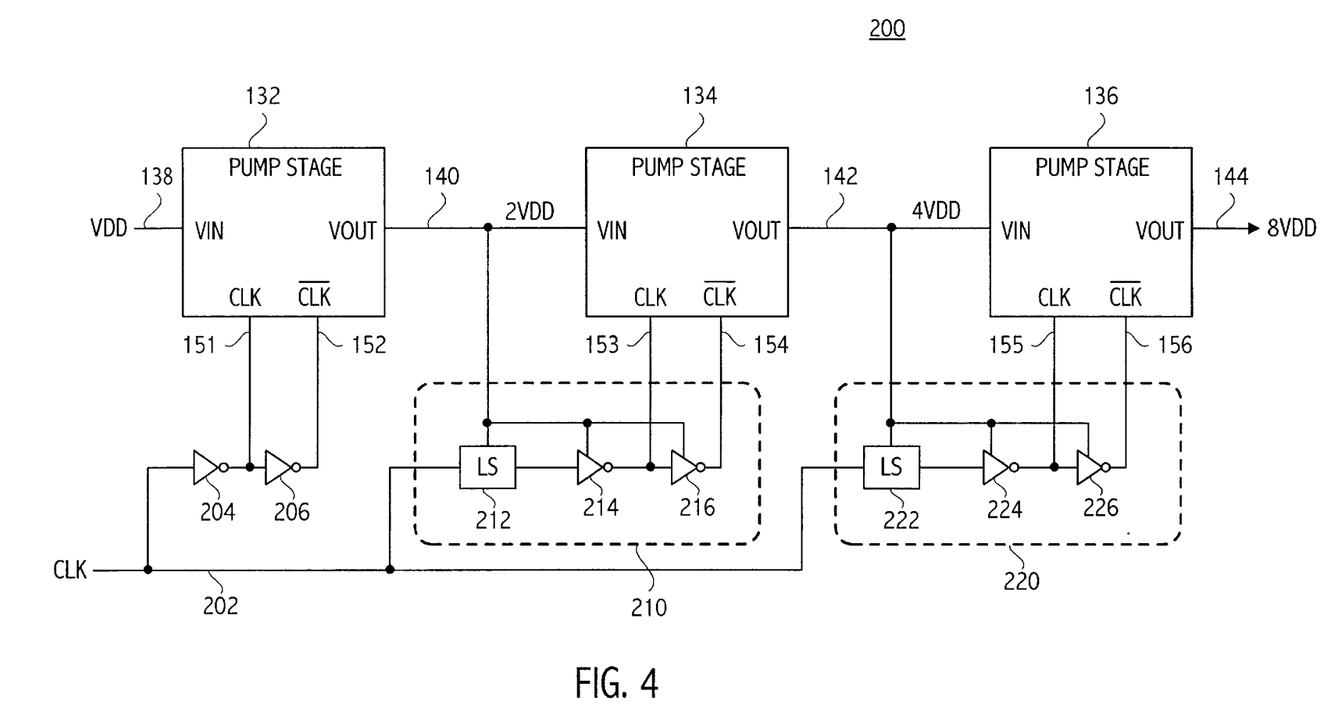
FIG. 4 is a block diagram of a charge pump circuit in accordance with another preferred embodiment of the present invention.

Referring now to FIG. 4, another preferred embodiment is depicted of a charge pump circuit that includes three serially-connected charge pump stages 132, 134, and 136, as before described in relation to charge pump circuit 130. This charge pump circuit 200 includes a different arrangement of clock circuits for generating a respective pair of complementary clock signals for each respective charge pump stage having amplitudes equal to the respective input voltage for each respective charge pump stage.

In this embodiment, the input voltage to the first serially-connected charge pump stage 132 is VDD. The associated clock circuit for this stage includes two simple inverter circuits 204, 206, operated traditionally using VDD and VSS, to generate complementary clock signals on nodes 151 and 152. The associated clock circuit 210 for charge pump stage 134 includes a level shifter 212 and two inverters 214 and 216, each powered by the 2VDD voltage conveyed on node 140 to the input node of the pump stage 134. The level shifter 212 receives the VDD-level clock signal CLK and generates on its output a clock signal having an amplitude of 2VDD, which is buffered by the two inverters 214, 216 to generate complementary clock signals on nodes 153 and 154 having magnitudes of 2VDD. The associated clock circuit 220 for charge pump stage 136 includes a level shifter 222 which receives the VDD-level clock signal CLK and generates on its output a clock signal having an amplitude of 4VDD, which is buffered by the two inverters 224, 226 to generate complementary clock signals on nodes 155 and 156 having magnitudes of 4VDD.

Alternatively, the level shifters 212 and 222 may only need to generate an output signal having a high level exceeding the input threshold of the following inverters 214, 224. Although the power dissipation may be somewhat higher, the output high level of level shifter 212 may not need to be fully equal to 2VDD, which may simplify the design of such a level shifter. Moreover, the input to level shifter 222 may be alternatively taken from a 2VDD-level signal, such as either of the complementary clock signals on nodes 153 or 154, rather than level shifting all the way from a VDD-level signal such as the CLK signal conveyed on node 202.

Figure 5:
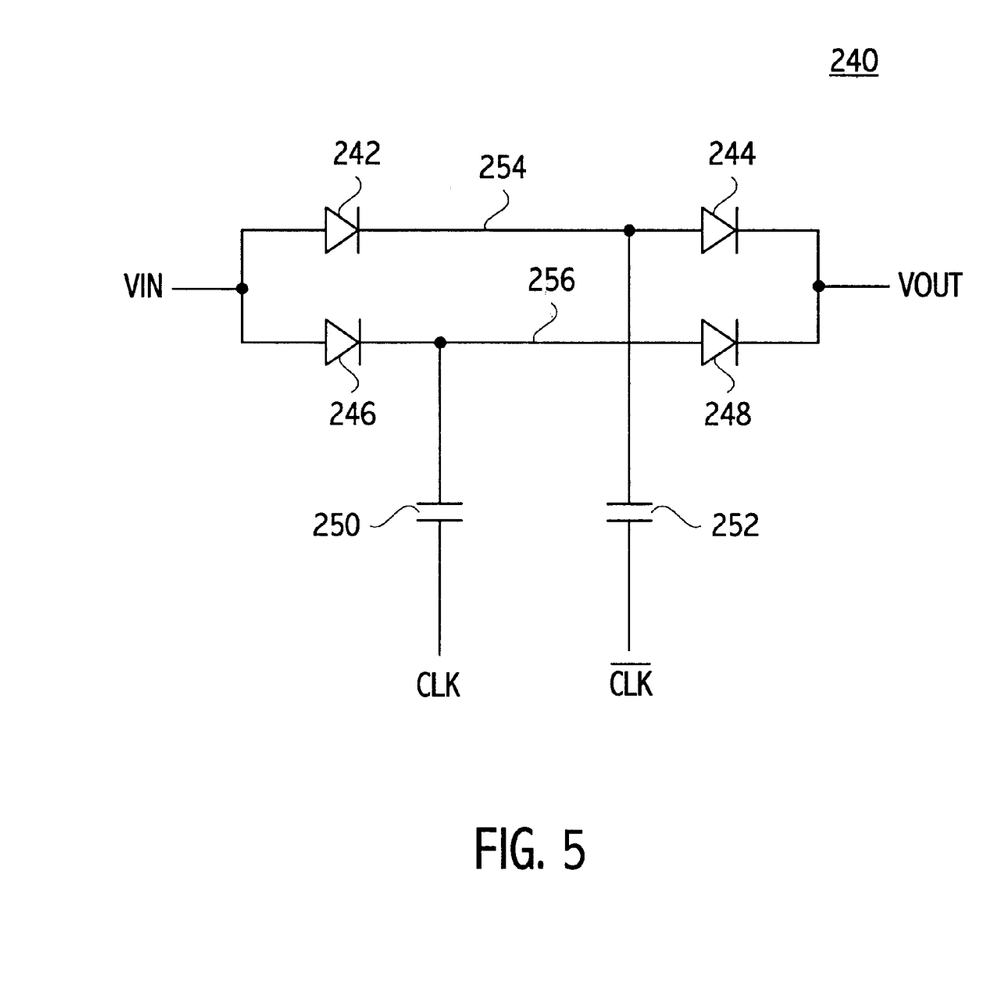
FIG. 5 is a schematic diagram of another embodiment of a charge pump stage useful for the present invention.

Another embodiment of a useful complementary-clocked charge pump stage is shown in FIG. 5. Here, a charge pump stage 240 includes diode 246, capacitor 250, and diode 248 connected to a single clock phase not unlike an individual stage of the prior art circuit shown in FIG. 1, but also includes an identical parallel structure including diode 242, capacitor 252, and diode 244 connected to a complementary clock phase.

Figure 6:
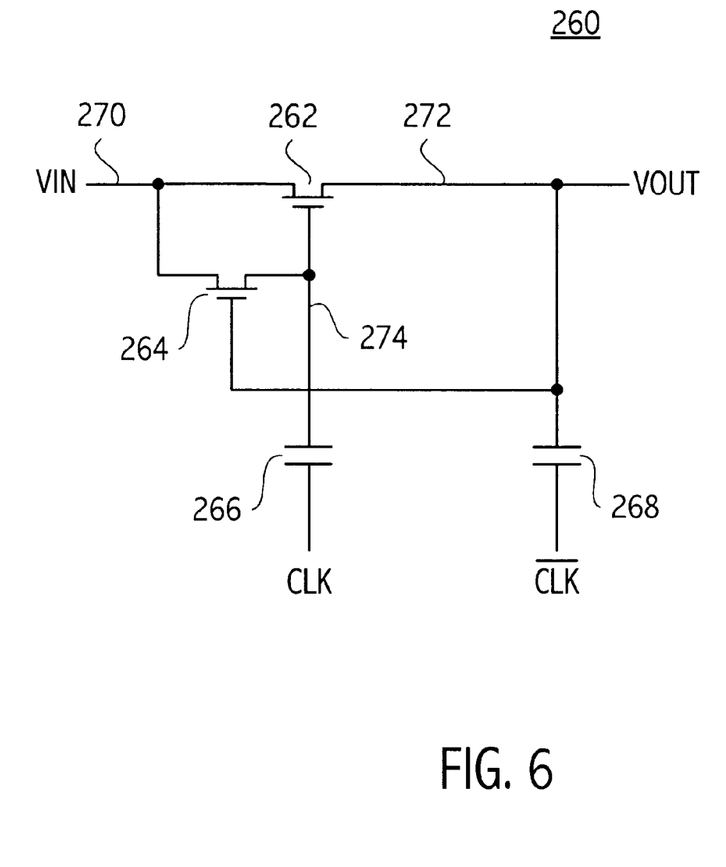
FIG. 6 is a schematic diagram of another embodiment of a charge pump stage useful for the present invention.

Yet another embodiment of a useful complementary-clocked charge pump stage is shown in FIG. 6. Here, a charge pump stage 260 includes two N-channel transistors 262, 264 and capacitors 266, 268. When the CLK signal is low and the /CLK signal is high, node 272 is boosted well above VIN and turns on transistor 264 to charge node 274 to VIN. Since node 274 and node 270 are both at VIN, transistor 262 is off even though node 272 is well above VIN. When the two complementary clock signals transition, node 272 is capacitively coupled downward by the falling edge of the /CLK signal to a voltage low enough to turn transistor 264 off, and node 274 is capacitively coupled upward by the rising edge of the CLK signal to a voltage well above VIN, which turns on transistor 262, thus coupling node 272 to the input voltage VIN and charging capacitor 268 to the full VIN voltage without any loss of voltage due to diode drops (as with the circuit shown in FIG. 5). When the two complementary clock signals next transition, node 274 is capacitively coupled downward by the falling edge of the CLK signal to a voltage low enough to turn transistor 262 off, and node 272 is capacitively coupled upward by the rising edge of the complementary /CLK signal to a voltage nominally equal to 2VIN.

Figure 7:
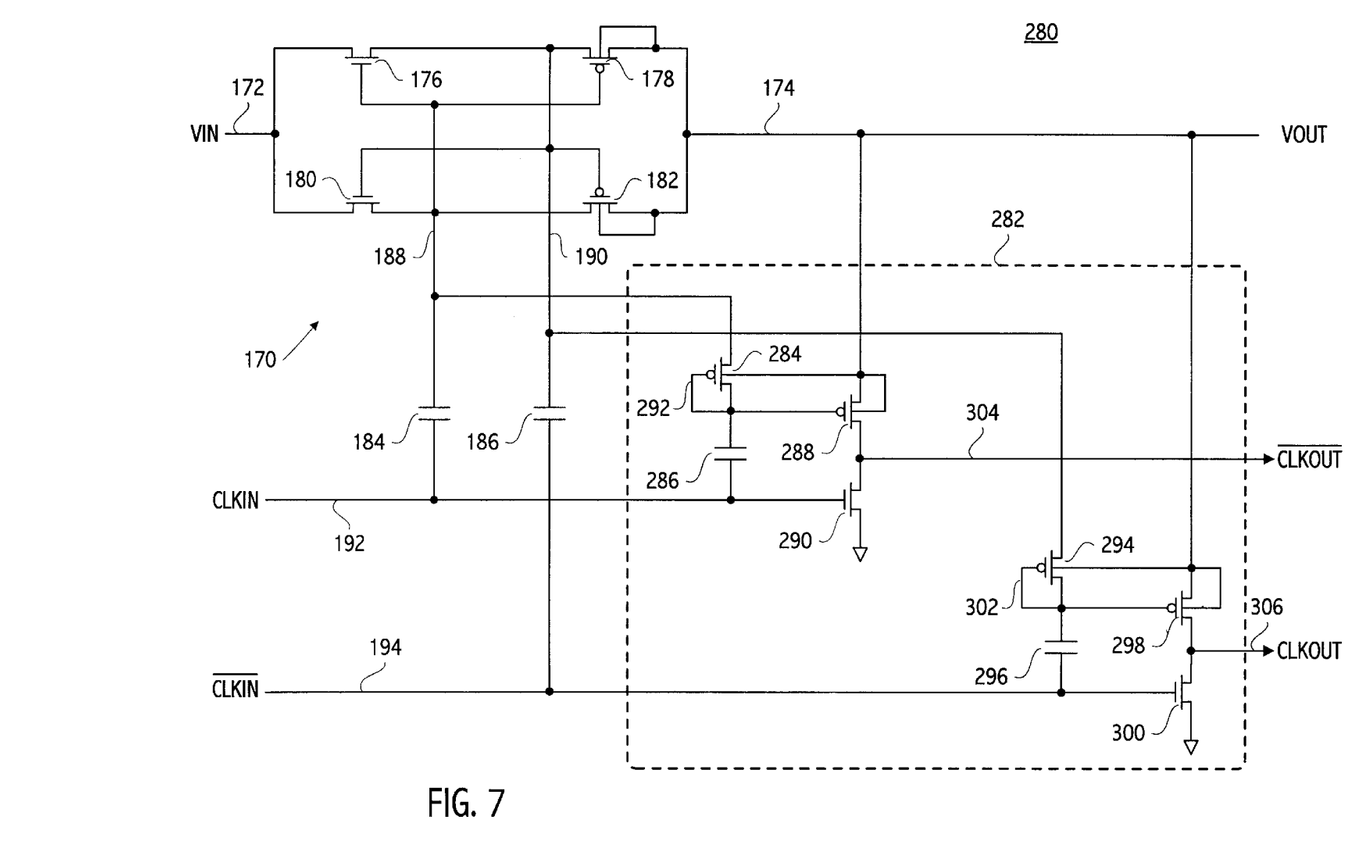
FIG. 7 is a schematic diagram of a combined charge pump stage and clock circuit useful for the present invention.

Referring now to FIG. 7, a combined circuit 280 is depicted which includes a charge pump stage 170 and a clock circuit 282 for generating clock signals having appropriate amplitudes for a succeeding charge pump stage. The charge pump stage 170 includes transistors 176, 178, 180, 182 and capacitors 184, 186 and is described above in regards to FIG. 3 and will not be further described.

The clock circuit 282 includes two identical circuits for generating a level-shifted clock signal, only one of which is described in detail herein. A clock signal CLKIN is conveyed on node 192 to the gate of transistor 290 which, together with transistor 288, forms an inverter and drives a complementary clock signal /CLKOUT (conveyed on node 304) to the next charge pump stage with a low level of VSS and a high level of 2VIN (the voltage of VOUT). When CLKIN is high (having a high level equal to VIN), node 188 is boosted to a voltage of node 174, which is 2VIN. The diode-connected P-channel transistor 284 turns on to drive the voltage of node 292 up to a value equal to 2VIN minus the P-channel threshold voltage. Consequently, transistor 288 is turned off (although biased at the point of turn on), allowing node 304 to be pulled fully to VSS by transistor 290.

Since at this time the voltage of node 292 is 2VIN minus the P-channel threshold voltage, and the voltage of node 192 (the CLKIN signal) is VIN, a voltage equal to VIN minus the magnitude of the P-channel threshold voltage is developed across the capacitor 286. When the CLKIN signal then transitions low, capacitor 286 couples node 292 downward by a significant amount, which turns on transistor 288 by virtually the same amount, and the output node 304 is driven robustly to the voltage of node 174, which is 2VIN. Capacitor 286 is advantageously sized, relative to the stray and load capacitances on node 292, so that the amount by which node 292 is coupled downward is a significant percentage of the voltage change on node 192.

In like fashion, transistors 294, 298, 300 and capacitor 296 function to level shift and invert the /CLKIN signal to generate on node 306 a CLKOUT signal having a low level of VSS and a high level of 2VIN.

Figure 8:
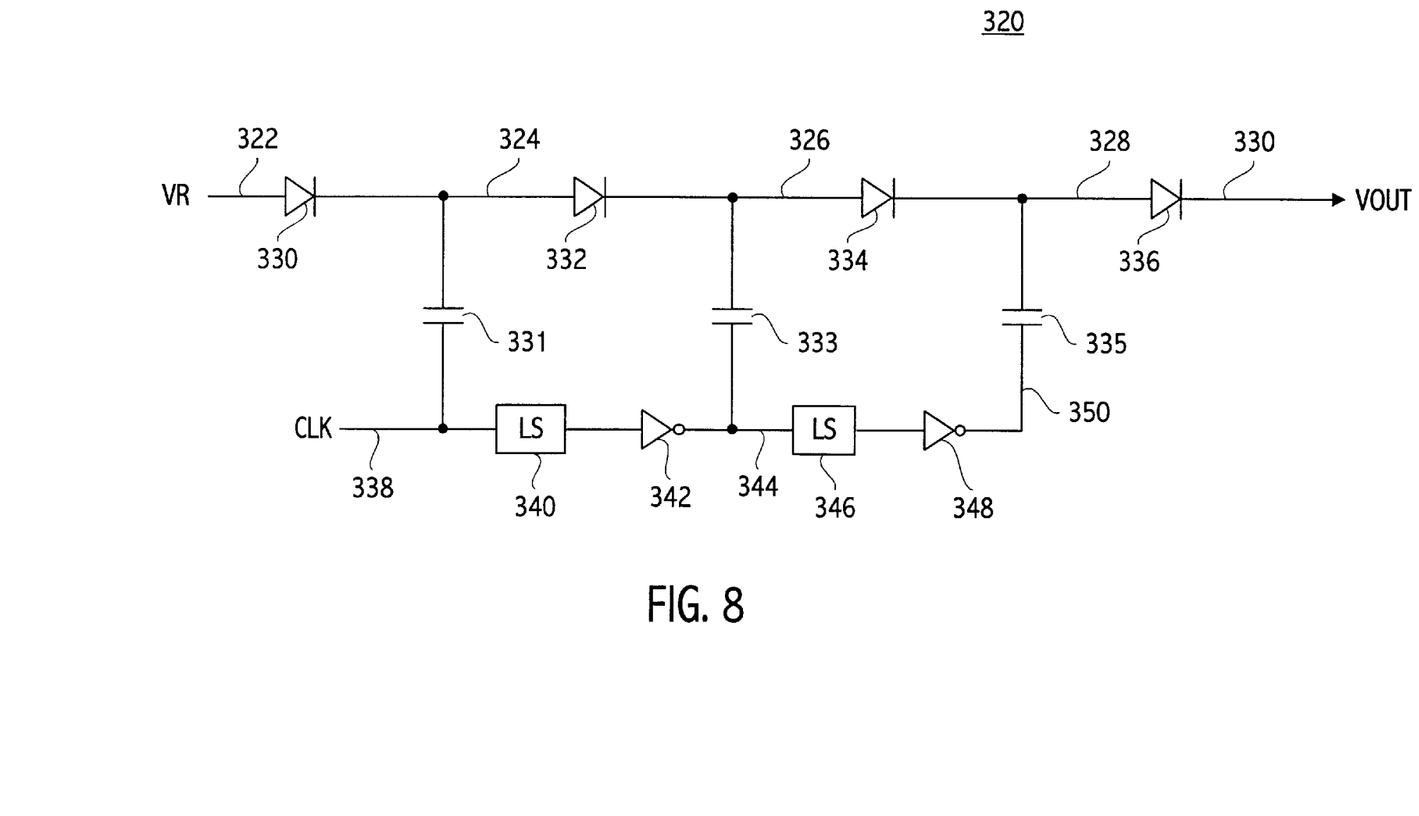
FIG. 8 is a block/schematic diagram of a charge pump in accordance with a preferred embodiment of the present invention.

Referring now to FIG. 8, a charge pump circuit 320 is depicted which uses only a single clock phase per charge pump stage. The diodes 330, 332, 334, 336 and the capacitors 331, 333, 335 are arranged in a traditional manner except for the clock signals coupled to drive the capacitors.

In this charge pump circuit 320 each respective charge pump stage utilizes a respective clock or complement clock signal having a respectively greater magnitude. The first serially-connected charge pump stage (i.e., diode 322 and capacitor 331) is clocked by a VDD-level true clock signal CLK. A level shifter 340 and inverter 342 form a clock circuit which functions to generate a complementary clock signal on node 344 having a preferred amplitude at or near 2VDD, and more preferably in the range from 2VDD to two diode drops below 2VDD (i.e., 2(VDD-VDIODE) to 2VDD), which complementary clock signal is coupled to drive capacitor 333 of the second charge pump stage. Similarly, level shifter 346 and inverter 348 form a clock circuit which functions to generate a true clock signal on node 350 having a preferred amplitude at or near 4VDD, and more preferably in the range from 4VDD to four diode drops below 4VDD (i.e., 4(VDD-VDIODE) to 4VDD), which clock signal is coupled to drive capacitor 335 of the third charge pump stage. It should be appreciated each clock circuit (e.g., level shifter 340 and inverter 342) may be implemented using any of a variety of suitable level shifting and/or buffering circuits so long as its respective clock output is of proper polarity and amplitude. Consequently, the specific block diagram structure shown in FIG. 8 is to be taken in an exemplary and not a limiting manner.

In the prior art circuit depicted in FIG. 1, the traditional charge pump circuit is clocked by complementary clock signals each having a low level equal to VSS and a high level equal to VDD (each clock signal having an amplitude equal to VDD). In the embodiment depicted in FIG. 8, while apparently similar at first glance, utilizes clock signals which alternate polarity at each successive charge pump stage (as before), but which clock phases generally double or nearly double in amplitude for each successive charge pump stage. As a result, the charge pump circuit 320 functions to generate an output voltage which is substantially an exponential function of the number of stages (ignoring the diode drop per stage) rather than a multiplicative function as with the FIG. 1 circuit. In many charge pump circuits, such as those shown in FIG. 1 or FIG. 8, a final isolation diode (e.g., isolation diode 336 in FIG. 8) may be viewed as forming part of the last serially-connected charge pump stage.

Figure 9:
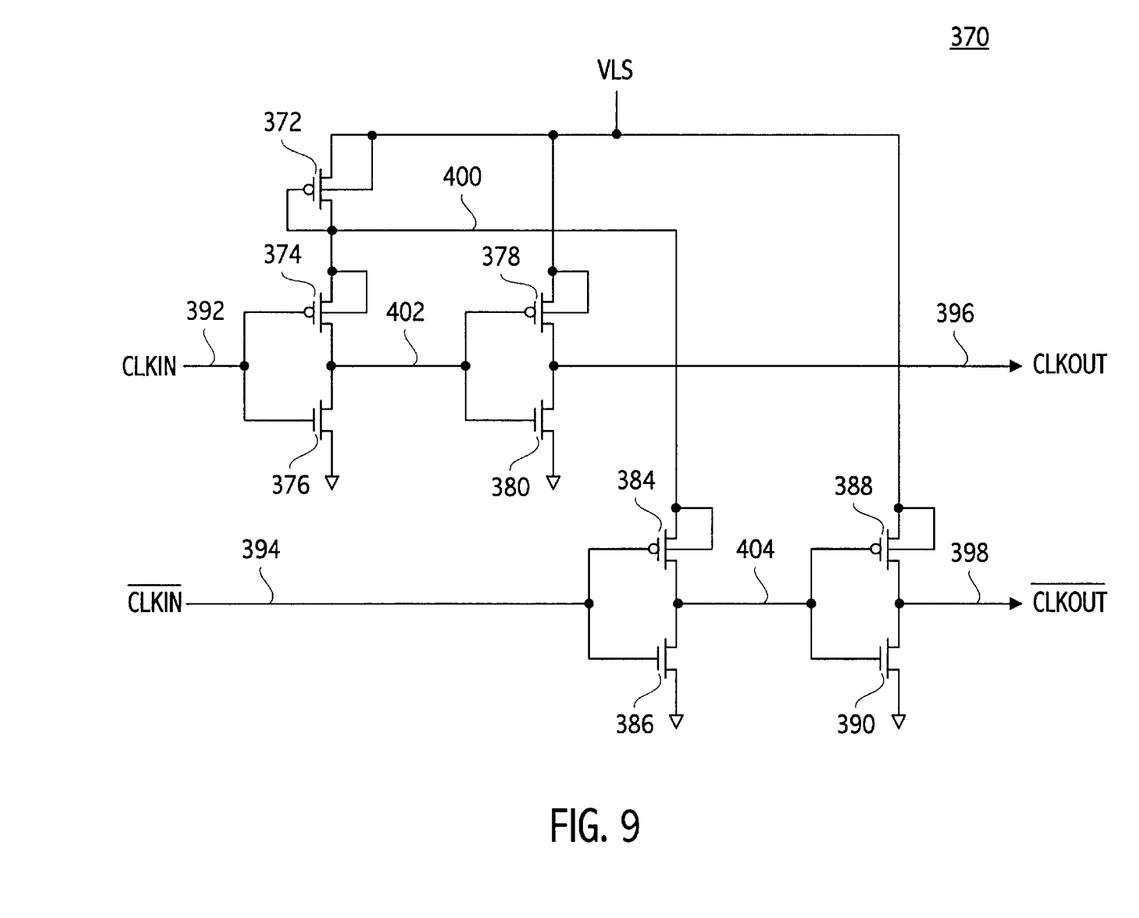
FIG. 9 is a schematic diagram of a clock circuit useful for the present invention.

Referring now to FIG. 9, another embodiment of a clock circuit is depicted which receives a complementary pair of clock signals and generates a level-shifted complementary pair of output clocks each having a greater amplitude than the input clock signals. A true clock signal CLKIN is conveyed on node 392 to a first inverter (transistors 374, 376). Since the high level of the CLKIN signal is lower than the "power supply" voltage VLS operating this circuit 370, a current limiting transistor 372 is included to limit the current through transistor 374 when the CLKIN signal is high so that node 402 may be driven adequately close to VSS. A second inverter (transistors 378, 380) then drives the CLKOUT signal fully to the VLS voltage. A complement clock signal /CLKIN is conveyed on node 394 to an inverter (transistors 384, 386). When the /CLKIN signal is low, the intermediate voltage developed on node 400 (by transistors 372 and 374) is sufficiently high so that transistor 384 drives node 404 to a high enough voltage to amply exceed the input threshold of a second inverter (transistors 388, 390), which then drives the complementary output clock signal /CLKOUT to VSS.

A clock circuit such as clock circuit 370 may be particularly useful for the clock circuit 147 shown in FIG. 2, or for the clock circuit 210 shown in FIG. 4, where the amplitude increase in the output clock signals, relative to the input clock signals, is modest.

Referring again to the charge pump circuit 130 depicted in FIG. 2, each charge pump stage is preferably implemented using an identical circuit, but each such stage preferably is progressively larger than its succeeding stage so that the total power deliverable by the charge pump circuit 130 may be more optimal for a given layout area. For example, the final charge pump stage 136 may be assumed to deliver I amps at V volts, for a power of P watts (recalling that $P=I\times V$). Since the output voltage of the preceding stage 134 is nominally one-half V, the current delivered must nominally be increased to 2I. Consequently, the size of the charge pump stage 134 must be doubled (each transistor and capacitor within charge pump stage 134 doubled in effective size) to deliver the same power P as the following stage 136. Due to additional current required to charge and discharge various parasitic capacitances and to support other undesired current flow within the charge pump stages, the charge pump stage 134 is preferably 4 times larger than the charge pump stage 136. Similarly, the charge pump stage 132 is preferably 4 times larger than the charge pump stage 134. Moreover, if the semiconductor process used to implement the charge pump circuit embodiments described herein so provides, transistors within the charge pump circuit are preferably implemented as high voltage transistors.

In the descriptions herein, certain clock signals may be labeled as true clock signals, while others are labeled as complement clock signals. Such a particular polarity designation is intended to convey the relative polarity between the various clock signals, and consequently the true and complement clock signals may be interchanged with no ill effect as long as the amplitude of a given clock signal is unchanged.

As used herein, a "complementary pair" of clock signals need not precisely be at all times complementary, but is meant to include a pair of signals that are only generally complementary. For example, they may be non-overlapping, where both are low at certain times, and only one such clock signal goes high at any time. Alternatively, the complementary clock signals may overlap during each such signal's transition from high to low and from low to high.

As used herein, the amplitude of a signal (e.g., such as a clock signal) refers to the difference in voltage between the high level and the low level of the signal. If such a signal has VSS or the ground reference as its low level, and VDD for its high level, the signal may be termed a VDD-level signal or a full VDD-level signal. Such a signal also has an amplitude equal in magnitude to VDD, but so would another signal having a low level of VDD and a high level of 2VDD, as would yet another signal having a low level equal to negative one-half VDD and a high level equal to positive one-half VDD. The amplitude of complementary pair of signals refers to the amplitude of both signals of such a pair.

While the invention has been described above in the context of these several exemplary embodiments, the invention is not to be limited to such embodiments. For example, the invention is not limited to charge pump circuits implemented to generate a voltage above VDD, for charge pump circuits may be easily configured to generate an output voltage below VSS (i.e., the lower power supply reference voltage). Moreover, an initial input voltage other than VDD may also be used to generate an output voltage which is a function of an arbitrary reference voltage VR, rather than one which is a function of VDD. A wide variety of clock circuits, utilizing an equally wide variety of level shifter circuits and buffering circuits may be used without departing from the teachings of the present invention. Accordingly, other embodiments, variations, and improvements not described herein are not necessarily excluded from the scope of the invention, which is defined by the following appended claims.

General Terminology

Regarding general terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. It may be correct to think of signals being conveyed on wires or buses. For example, one might describe a particular circuit operation as "the output of circuit 10 drives the voltage of node 11 toward VDD, thus asserting the signal OUT conveyed on node 11." This is an accurate, albeit somewhat cumbersome expression. Consequently, it is well known in the art to equally describe such a circuit operation as "circuit 10 drives node 11 high," as well as "node 11 is brought high by circuit 10," "circuit 10 pulls the OUT signal high" and "circuit 10 drives OUT high." Such shorthand phrases for describing circuit operation are more efficient to communicate details of circuit operation, particularly because the schematic diagrams in the figures clearly associate various signal names with the corresponding circuit blocks and node names. For convenience, an otherwise unnamed node conveying the CLK signal may be referred to as the CLK node. Similarly, phrases such as "pull high," "drive high," and "charge" are generally synonymous unless otherwise distinguished, as are the phrases "pull low," "drive low," and "discharge." It is believed that use of these more concise descriptive expressions enhances clarity and teaching of the disclosure. It is to be appreciated by those skilled in the art that each of these and other similar phrases may be interchangeably used to describe common circuit operation, and no subtle inferences should be read into varied usage within this description.

As an additional example, a logic signal has an active level and an inactive level (at least for traditional binary logic signals) and the active and inactive levels are sometimes also respectively called active and inactive "states." The active level for some logic signals is a high level (i.e., an "active-high" signal) and for others is a low level (i.e., an "active-low" signal). A logic signal is "asserted" or "activated" when driven to the active level. Conversely, a logic signal is "de-asserted" or "de-activated" when driven to the inactive level. A high logic level is frequently referred to as a logic "1" and a low logic level is frequently referred to as a logic "0" (at least for positive logic).

Frequently logic signals are named in a fashion to convey which level is the active level. For example, CLKEN is commonly used to name an active-high clock enable signal, because the true polarity is implied in the name. Conversely, CLKENB, /CLKEN, CLKEN#, CLKEN*, CLKEN_L, CLKEN_C, or #CLKEN are commonly used to name an active-low clock enable signal, because one of the many common expressions indicating the complement polarity is used in the name. Complementary pairs of signals or node names, such as true and complement clock lines, and true and complement bit lines within a column of a memory array, are frequently named to clarify the polarity of both nodes or signals (e.g., BL3T and BL3C; BL6_T and BL6_C) and in other instances, only the complement polarity may be indicated in the names (e.g., CLK and /CLK, or CLK and CLK#, or BL and BLB). In still other cases, two "complementary" signals are both inactive at one state (e.g., both inactive low), and only one is driven to an active level to convey the polarity of the signal. For example, two complementary address lines (e.g., A2T and A2C) may be both inactive low during a quiescent portion of a cycle. Later, A2T is driven high to indicate that the received address A2 is high (A2=H). Alternatively, A2C is driven high to indicate that the address received is low (A2=L). It is to be appreciated by those skilled in the art that these and other similar phrases may be used to name the signals and nodes. The schematic diagrams and accompanying description of the signals and nodes should in context be clear.

A transistor may be conceptualized as having a control terminal which controls the flow of current between a first current handling terminal (or current carrying terminal) and a second current handling terminal. An appropriate condition on the control terminal causes a current to flow from/to the first current handling terminal and to/from the second current handling terminal (for typical operating voltages of the first and second current handling terminals). In a bipolar NPN transistor, the first current handling terminal may be deemed the emitter, the control terminal deemed the base, and the second current handling terminal deemed the collector. A sufficient base current into the base causes a collector-to-emitter current to flow (for typical collector-to-emitter operating voltages). In a bipolar PNP transistor, the first current handling terminal may be deemed the emitter, the control terminal deemed the base, and the second current handling terminal deemed the collector. A sufficient base current exiting the base causes an emitter-to-collector current to flow (for typical collector-to-emitter operating voltages).

An MOS transistor may likewise be conceptualized as having a control terminal which controls the flow of current between a first current handling terminal and a second current handling terminal. Although MOS transistors are frequently discussed as having a drain, a gate, and a source, in most such devices the drain is interchangeable with the source. This is because the layout and semiconductor processing of the transistor is symmetrical (which is typically not the case for bipolar transistors). For an N-channel MOS transistor, the current handling terminal normally residing at the higher voltage is customarily called the drain. The current handling terminal normally residing at the lower voltage is customarily called the source. A sufficiently high voltage on the gate (relative to the source voltage) causes a current to therefore flow from the drain to the source (provided the respective voltage of the drain and source are different). For an enhancement mode N-channel device, a positive gate-to-source voltage greater than the threshold voltage (including body effect) is sufficient. The source voltage referred to in N-channel MOS device equations merely refers to whichever current handling terminal has the lower voltage at any given point in time. For example, the "source" of the N-channel device of a bi-directional CMOS transfer gate depends on which side of the transfer gate is at the lower voltage. To reflect this symmetry of most N-channel MOS transistors, the control terminal may be deemed the gate, the first current handling terminal may be termed the "drain/source", and the second current handling terminal may be termed the "source/drain". Such a description is equally valid for a P-channel MOS transistor, since the polarity between drain and source voltages, and the direction of current flow between drain and source, is not implied by such terminology. Alternatively, one current handling terminal may arbitrarily deemed the "drain" and the other deemed the "source", with an implicit understanding that the two are not distinct, but interchangeable.

Regarding power supplies, a single positive power supply voltage (e.g., a 2.5 volt power supply) used to power a circuit is frequently named the "VDD" power supply. In an integrated circuit, transistors and other circuit elements are actually connected to a VDD terminal or a VDD node, which is then operably connected to the VDD power supply. The colloquial use of phrases such as "tied to VDD" or "connected to VDD" is understood to mean "connected to the VDD node", which is typically then operably connected to actually receive the VDD power supply voltage during use of the integrated circuit.

The reference voltage for such a single power supply circuit is frequently called "VSS." Transistors and other circuit elements are actually connected to a VSS terminal or a VSS node, which is then operably connected to the VSS power supply during use of the integrated circuit. Frequently the VSS terminal is connected to a ground reference potential, or just "ground." Describing a node which is "grounded" by a particular transistor or circuit (unless otherwise defined) means the same as being "pulled low" or "pulled to ground" by the transistor or circuit.

Generalizing somewhat, the first power supply terminal is frequently named "VDD", and the second power supply terminal is frequently named "VSS." Both terms may appear either using subscripts (e.g., $V_{DD}$) or not. Historically the nomenclature "$V_{DD}$" implied a DC voltage connected to the drain terminal of an MOS transistor and $V_{SS}$ implied a DC voltage connected to the source terminal of an MOS transistor. For example, old PMOS circuits used a negative VDD power supply, while old NMOS circuits used a positive VDD power supply. Common usage, however, frequently ignores this legacy and uses VDD for the more positive supply voltage and VSS for the more negative (or ground) supply voltage unless, of course, defined otherwise. Describing a circuit as functioning with a "VDD supply" and "ground" does not necessarily mean the circuit cannot function using other power supply potentials. Other common power supply terminal names are "VCC' (a historical term from bipolar circuits and frequently synonymous with a +5 volt power supply voltage, even when used with MOS transistors which lack collector terminals) and "GND" or just "ground."

The block diagrams herein may be described using the terminology of a single node connecting the blocks. Nonetheless, it should be appreciated that, when required by the context, such a "node" may actually represent a pair of nodes for conveying a differential signal, or may represent multiple separate wires (e.g., a bus) for carrying several related signals or for carrying a plurality of signals forming a digital word.

While the invention has been largely described with respect to the embodiments set forth above, the invention is not necessarily limited to these embodiments. Variations and modifications of the embodiments disclosed herein may be made based on the description set forth herein, without departing from the scope and spirit of the invention as set forth in the following claims. Accordingly, other embodiments, variations, and improvements not described herein are not necessarily excluded from the scope of the invention, which is defined by the following appended claims.

What is claimed is:

1. A charge pump circuit comprising:
   a plurality of serially-connected pump stages, each responsive to at least one associated clock signal;
   wherein an associated clock signal for one of the pump stages differs in amplitude from an associated clock signal for at least one other pump stage.

2. The circuit as recited in claim 1 wherein:

each clock signal associated with a respective pump stage has a respective amplitude associated therewith; and the clock signal amplitude for a given pump stage is greater than or equal to the clock signal amplitude for a pump stage immediately preceding the given pump stage.

3. The circuit as recited in claim 1 wherein:

each clock signal associated with a respective pump stage has a respective amplitude associated therewith; and the respective clock signal amplitude is different for each respective pump stage.

4. The circuit as recited in claim 3 wherein:

the respective clock signal amplitude for each respective pump stage increases with each succeeding pump stage.

5. The circuit as recited in claim 4 wherein:

the respective amplitude of clock signals associated with a respective pump stage increases by a multiplicative factor with each succeeding pump stage.

6. The circuit as recited in claim 4 wherein:

the respective amplitude of clock signals associated with a respective pump stage increases by approximately a factor of two with each succeeding pump stage.

7. The circuit as recited in claim 1 wherein:

each of the plurality of serially-connected pump stages is responsive to an associated complementary pair of clock signals; and the complementary clock signals associated with a respective one of the pump stages differ in amplitude from a complementary pair of clock signals associated with at least one other pump stage.

8. The circuit as recited in claim 7 wherein:

each clock signal associated with a respective pump stage has a respective amplitude associated therewith; and the clock signal amplitude for a given pump stage is greater than or equal to the clock signal amplitude for a pump stage immediately preceding the given pump stage.

9. The circuit as recited in claim 7 wherein:

each clock signal associated with a respective pump stage has a respective amplitude associated therewith; and the respective clock signal amplitude is different for each respective pump stage.

10. The circuit as recited in claim 9 wherein:

the respective clock signal amplitude for each respective pump stage increases with each succeeding pump stage.

11. The circuit as recited in claim 10 wherein:

the respective amplitude of clock signals associated with a respective pump stage increases by a multiplicative factor with each succeeding pump stage.

12. The circuit as recited in claim 10 wherein:

the respective amplitude of clock signals associated with a respective pump stage increases by a substantially uniform multiplicative factor with each succeeding pump stage.

13. The circuit as recited in claim 12 wherein:

the respective amplitude of clock signals associated with a respective pump stage increases by approximately a factor of two with each succeeding pump stage.

14. The circuit as recited in claim 7 wherein at least one pump stage comprises:

a first pair of cross-coupled transistors of a first polarity, each having a respective source terminal coupled to an input terminal of the pump stage, each having a respective drain terminal coupled to a respective one of a pair of internal cross-coupled nodes, and each having a respective gate terminal coupled to the respective drain terminal of the other transistor of the first pair;

a second pair of cross-coupled transistors of a second polarity opposite the first polarity, each having a respective source terminal coupled to an output terminal of the pump stage, each having a respective drain terminal coupled to a respective one of the pair of internal cross-coupled nodes, and each having a respective gate terminal coupled to the respective drain terminal of the other transistor of the second pair; and a pair of capacitors, each coupling a respective one of the complementary pair of clock signals associated with the pump stage to a respective one of the pair of internal cross-coupled nodes.

15. The circuit as recited in claim 7 wherein at least one pump stage comprises:

a first pair of diodes, each having a respective first terminal coupled to an input terminal of the pump stage, and each having a respective second terminal coupled to a respective one of a pair of internal nodes;

a second pair of diodes, each having a respective first terminal coupled to an output terminal of the pump stage, and each having a respective second terminal coupled to a respective one of the pair of internal nodes; and a pair of capacitors, each coupling a respective one of the complementary pair of clock signals associated with the pump stage to a respective one of the pair of internal nodes.

16. The circuit as recited in claim 7 wherein each pump stage comprises:

a first pair of cross-coupled transistors of a first polarity, each having a respective source terminal coupled to an input terminal of the pump stage, each having a respective drain terminal coupled to a respective one of a pair of internal cross-coupled nodes, and each having a respective gate terminal coupled to the respective drain terminal of the other transistor of the first pair;

a second pair of cross-coupled transistors of a second polarity opposite the first polarity, each having a respective source terminal coupled to an output terminal of the pump stage, each having a respective drain terminal coupled to a respective one of the pair of internal cross-coupled nodes, and each having a respective gate terminal coupled to the respective drain terminal of the other transistor of the second pair; and a pair of capacitors, each coupling a respective one of the complementary pair of clock signals associated with the pump stage to a respective one of the pair of internal cross-coupled nodes.

17. The circuit as recited in claim 16 wherein:

each clock signal associated with a respective pump stage has a respective amplitude associated therewith; and the clock signal amplitude for a given pump stage is greater than or equal to the clock signal amplitude for a pump stage immediately preceding the given pump stage.

18. The circuit as recited in claim 16 wherein:

each clock signal associated with a respective pump stage has a respective amplitude associated therewith; and the respective clock signal amplitude is different for each respective pump stage.

19. The circuit as recited in claim 18 wherein:

the respective clock signal amplitude for each respective pump stage increases with each succeeding pump stage.

20. The circuit as recited in claim 19 wherein:
the respective amplitude of clock signals associated with a respective pump stage increases by a multiplicative factor with each succeeding pump stage.

21. The circuit as recited in claim 19 wherein:
the respective amplitude of clock signals associated with a respective pump stage increases by a substantially uniform multiplicative factor with each succeeding pump stage.

22. The circuit as recited in claim 19 wherein:
the respective amplitude of clock signals associated with a respective pump stage increases by approximately a factor of two with each succeeding pump stage.

23. A charge pump circuit comprising:
a plurality of serially-connected pump stages, each having an input node and an output node, the input node of a first such serially-connected pump stage coupled to receive an input voltage for the charge pump circuit, each respective pump stage responsive to a respective complementary pair of clock signals having a respective amplitude, for generating a boosted output voltage on the output node of a last such serial-connected pump stage;
wherein at least two of the complementary pairs of clock signals have different amplitudes.

24. The circuit as recited in claim 23 wherein:
the complementary pair of clock signals for a given stage has an amplitude greater than that of the complementary pair of clock signals for an immediately preceding pump stage.

25. The circuit as recited in claim 24 wherein:
the amplitude of the clock signals for a given pump stage is substantially equal to the magnitude, relative to a ground reference voltage, of a voltage nominally generated on the input of the given pump stage by an immediately preceding pump stage.

26. The circuit as recited in claim 25 wherein each pump stage comprises:
a first pair of cross-coupled transistors of a first polarity, each having a respective source terminal coupled to the input terminal of the pump stage, each having a respective drain terminal coupled to a respective one of a pair of internal cross-coupled nodes, and each having a respective gate terminal coupled to the respective drain terminal of the other transistor of the first pair;
a second pair of cross-coupled transistors of a second polarity opposite the first polarity, each having a respective source terminal coupled to the output terminal of the pump stage, each having a respective drain terminal coupled to a respective one of the pair of internal cross-coupled nodes, and each having a respective gate terminal coupled to the respective drain terminal of the other transistor of the second pair; and
a pair of capacitors, each coupling a respective one of the complementary pair of clock signals associated with the pump stage to a respective one of the pair of internal cross-coupled nodes.

27. The circuit as recited in claim 25 further comprising:
a plurality of clock circuits, each for respectively generating the respective complementary pair of clock signals for a respective pump stage having a respective amplitude which is substantially equal to the magnitude, relative to a ground reference voltage, of a voltage nominally generated on the input of the given pump stage by an immediately preceding pump stage.

28. The circuit as recited in claim 27 wherein:
each of the first pair of transistors comprises an N-channel transistor;
each of the second pair of transistors comprises a P-channel transistor; and
the boosted output voltage is more positive than the charge pump circuit input voltage.

29. A charge pump circuit comprising:
a plurality M of serially-connected pump stages, each having an input node and an output node, the input node of a first such serially-connected pump stage coupled to receive an input voltage for the charge pump circuit, each respective pump stage responsive to a respective one of a plurality M of complementary pairs of clock signals having a respective amplitude different for each respective pump stage, for generating a boosted output voltage on the output node of a last such serial-connected pump stage.

30. The circuit as recited in claim 29 wherein each pump stage comprises:
a first pair of cross-coupled transistors of a first polarity, each having a respective source terminal coupled to the input terminal of the pump stage, each having a respective drain terminal coupled to a respective one of a pair of internal cross-coupled nodes, and each having a respective gate terminal coupled to the respective drain terminal of the other transistor of the first pair;
a second pair of cross-coupled transistors of a second polarity opposite the first polarity, each having a respective source terminal coupled to the output terminal of the pump stage, each having a respective drain terminal coupled to a respective one of the pair of internal cross-coupled nodes, and each having a respective gate terminal coupled to the respective drain terminal of the other transistor of the second pair; and
a pair of capacitors, each coupling a respective one of the complementary pair of clock signals associated with the pump stage to a respective one of the pair of internal cross-coupled nodes.

31. The circuit as recited in claim 30 wherein:
each of the first pair of transistors comprises an N-channel transistor;
each of the second pair of transistors comprises a P-channel transistor; and
the boosted output voltage is more positive than the charge pump circuit input voltage.

32. The circuit as recited in claim 30 further comprising:
a plurality of clock circuits, each for respectively generating the respective complementary pair of clock signals for a respective pump stage having a respective amplitude which is substantially equal to the magnitude, relative to a ground reference voltage, of a voltage nominally generated on the input of the given pump stage by an immediately preceding pump stage.

33. A charge pump circuit comprising:
a plurality of serially-connected pump stages, each stage responsive to a respective complementary pair of clock signals; and
a plurality of clock circuits, each respectively having a complementary pair of clock signal outputs coupled to a respective pump stage, each respectively configured to generate for the respective pump stage a respective pair of complementary clocking signals having an amplitude substantially equal to the magnitude of an input voltage coupled to the respective stage.

34. The circuit as recited in claim 33:
incorporated within an integrated circuit including a non-volatile memory array;
wherein the output voltage of the charge pump circuit is used to generate a programming voltage for the non-volatile memory array.

* * * * *